(12) United States Patent
Bauchot et al.

(10) Patent No.: US 7,518,514 B2
(45) Date of Patent: Apr. 14, 2009

(54) ADAPTIVE RULE BASED ELECTRONIC REMINDER FOR PERSONAL OBJECTS

(75) Inventors: Frederic Bauchot, Saint-Jeannet (FR); Gerard Marmigère, Drap (FR)

(73) Assignee: International Business Machines Corporation, Armonk, NY (US)

(*) Notice: Subject to any disclaimer, the term of this patent is extended or adjusted under 35 U.S.C. 154(b) by 228 days.

(21) Appl. No.: 11/475,505

(22) Filed: Jun. 27, 2006

(65) Prior Publication Data

US 2007/0069897 A1    Mar. 29, 2007

(30) Foreign Application Priority Data

Sep. 28, 2005  (EP)  ................... 05108936

(51) Int. Cl.
G08B 13/14      (2006.01)
(52) U.S. Cl. ............. 340/572.1; 340/568.1; 340/539.11
(58) Field of Classification Search .............. 340/572.1, 340/568.1, 539.11
See application file for complete search history.

(56) References Cited

U.S. PATENT DOCUMENTS

| | | | | |
|---|---|---|---|---|
| 6,331,817 B1 * | 12/2001 | Goldberg | ................. | 340/573.1 |
| 6,462,660 B1 * | 10/2002 | Cannon et al. | ........... | 340/572.1 |
| 7,176,801 B2 * | 2/2007 | Matsukawa et al. | ...... | 340/572.5 |
| 7,230,536 B2 * | 6/2007 | Shinada et al. | ........... | 340/572.1 |
| 7,271,715 B2 * | 9/2007 | Aupperle et al. | ....... | 340/539.13 |
| 7,339,477 B2 * | 3/2008 | Puzio et al. | .............. | 340/572.1 |
| 2003/0195904 A1 * | 10/2003 | Chestnut et al. | ............. | 707/204 |

* cited by examiner

Primary Examiner—Jeff Hofsass
Assistant Examiner—Kerri L McNally
(74) Attorney, Agent, or Firm—Scully, Scott, Murphy & Presser, P.C.; William H. Steinberg, Esq.

(57) ABSTRACT

A method and systems for reminding a user about personal objects that should be carried or should not be carried, depending upon the user, the date and the time and other parameters. In the system, a radio frequency identifiers tag identifying each personal object is directly attached to the object. All the objects are listed in an object table storing the identifiers and their main characteristics. A rule table is provided having entries setting forth the relations between the objects according to four basis rules of the types "X requires Y", "X excludes Y", "X required" and "X excluded". When activated, the reminder device checks the present objects and analyzes the rules to determine which objects are missing and which objects should be absent. The user is forewarn if objects are missing or should be absent.

8 Claims, 6 Drawing Sheets

| ID1 | TYPE | ID2 | TIME | DIRECTION | WARNING |
|---|---|---|---|---|---|
| INDEX_1 | 1 | INDEX_2 | * | * | VEHICLE 1 INSURANCE MISSING |
| INDEX_1 | 1 | INDEX_3 | * | * | VEHICLE 1 REGISTRATION BOOK MISSING |
| INDEX_4 | 1 | INDEX_5 | * | * | VEHICLE 2 INSURANCE MISSING |
| INDEX_4 | 1 | INDEX_6 | * | * | VEHICLE 2 REGISTRATION BOOK MISSING |
| INDEX_7 | 1 | INDEX_8 | * | * | MOTORCYCLE INSURANCE MISSING |
| INDEX_7 | 1 | INDEX_9 | * | * | MOTORCYCLE REGISTRATION BOOK MISSING |
| INDEX_7 | 1 | INDEX_10 | * | * | HELMET MISSING |
| INDEX_1 | 2 | INDEX_4 | * | * | VEHICLE 1 AND VEHICLE 2 KEYS PRESENT |
| INDEX_7 | 2 | INDEX_1 | * | * | VEHICLE 1 AND MOTORCYCLE KEYS PRESENT |
| INDEX_4 | 2 | INDEX_7 | * | * | VEHICLE 2 AND MOTORCYCLE KEYS PRESENT |
| INDEX_22 | 1 | INDEX_26 | * | * | DRIVING LICENCE MISSING |
| INDEX_20 | 1 | INDEX_14 | MO-FR | * | COMPANY BADGE MISSING |
| INDEX_20 | 1 | INDEX_15 | MO-FR | * | COMPANY OFFICE KEYS MISSING |
| INDEX_27 | 1 | INDEX_23 | * | * | FRED'S DRIVING LICENCE MISSING |
| INDEX_28 | 1 | INDEX_24 | * | * | MARY'S DRIVING LICENCE MISSING |
| INDEX_29 | 1 | INDEX_25 | * | * | JEROME'S DRIVING LICENCE MISSING |
| INDEX_30 | 3 | INDEX_3 | * | * | HOME KEYS MISSING |
| INDEX_20 | 1 | INDEX_16 | * | * | FRED'S MOBILE PHONE MISSING |
| INDEX_19 | 1 | INDEX_17 | * | * | MARY'S MOBILE PHONE MISSING |
| INDEX_21 | 1 | INDEX_18 | * | * | JEROME'S MOBILE PHONE MISSING |
| INDEX_14 | 4 | - | SA-SU | * | COMPANY BADGE PRESENT |
| INDEX_15 | 4 | - | SA-SU | * | COMPANY OFFICE KEYS PRESENT |
| INDEX_20 | 1 | INDEX_31 | MO am | OUT | LAPTOP MISSING |
| INDEX_20 | 1 | INDEX_31 | FR-pm | IN | LAPTOP MISSING |
| INDEX_17 | 2 | INDEX_9 | * | * | MOTORCYCLE REGISTRATION BOOK PRESENT |

| INDEX | TYPE | IDENTIFIER | NICKNAME | OWNER |
|---|---|---|---|---|
| INDEX_1 | REAL | ID_A | VEHICLE 1 KEYS | – |
| INDEX_2 | REAL | ID_B | VEHICLE 1 INSURANCE | – |
| INDEX_3 | REAL | ID_C | VEHICLE 1 REGISTRATION BOOK | – |
| INDEX_4 | REAL | ID_D | VEHICLE 2 KEYS | – |
| INDEX_5 | REAL | ID_E | VEHICLE 2 INSURANCE | – |
| INDEX_6 | REAL | ID_F | VEHICLE 2 REGISTRATION BOOK | – |
| INDEX_7 | REAL | ID_G | MOTORCYCLE KEYS | FRED, JEROME |
| INDEX_8 | REAL | ID_H | MOTORCYCLE INSURANCE | FRED, JEROME |
| INDEX_9 | REAL | ID_I | MOTORCYCLE REGISTRATION BOOK | FRED, JEROME |
| INDEX_10 | REAL | ID_J | HELMET | FRED, JEROME |
| INDEX_11 | REAL | ID_K | FRED'S HOME KEYS | FRED |
| INDEX_12 | REAL | ID_L | MARY'S HOME KEYS | MARY |
| INDEX_13 | REAL | ID_M | JEROME'S HOME KEYS | JEROME |
| INDEX_14 | REAL | ID_N | COMPANY BADGE | FRED |
| INDEX_15 | REAL | ID_O | COMPANY OFFICE KEYS | FRED |
| INDEX_16 | REAL | ID_P | FRED'S MOBILE PHONE | FRED |
| INDEX_17 | REAL | ID_Q | MARY'S MOBILE PHONE | MARY |
| INDEX_18 | REAL | ID_R | JEROME'S MOBILE PHONE | JEROME |
| INDEX_19 | REAL | ID_S | MARY'S RING | MARY |
| INDEX_20 | REAL | ID_T | FRED'S SIGNET RING | FRED |
| INDEX_21 | REAL | ID_U | JEROME'S CHAIN BRACELET | JEROME |
| INDEX_22 | VIRTUAL | INDEX_1 OR INDEX_4 OR INDEX_7 | VEHICLE KEY | – |
| INDEX_23 | REAL | ID_V | FRED'S DRIVING LICENCE | FRED |
| INDEX_24 | REAL | ID_W | MARY'S DRIVING LICENCE | MARY |
| INDEX_25 | REAL | ID_X | JEROME'S DRIVING LICENCE | JEROME |
| INDEX_26 | VIRTUAL | INDEX_23 OR INDEX_24 OR INDEX_25 | DRIVING LICENCE | – |
| INDEX_27 | VIRTUAL | INDEX_20 AND INDEX_22 | FRED DRIVER | FRED |
| INDEX_28 | VIRTUAL | INDEX_19 AND INDEX_22 | MARY DRIVER | MARY |
| INDEX_29 | VIRTUAL | INDEX_21 AND INDEX_22 | JEROME DRIVER | JEROME |
| INDEX_30 | VIRTUAL | INDEX_11 OR INDEX_12 OR INDEX_13 | HOME KEYS | – |
| INDEX_31 | REAL | ID_Y | LAPTOP | FRED |

| | ID1 | TYPE | ID2 | TIME | DIRECTION | WARNING |
|---|---|---|---|---|---|---|
| | INDEX_1 | 1 | INDEX_2 | * | * | VEHICLE 1 INSURANCE MISSING |
| | INDEX_1 | 1 | INDEX_3 | * | * | VEHICLE 1 REGISTRATION BOOK MISSING |
| | INDEX_4 | 1 | INDEX_5 | * | * | VEHICLE 2 INSURANCE MISSING |
| 505-i | INDEX_4 | 1 | INDEX_6 | * | * | VEHICLE 2 REGISTRATION BOOK MISSING |
| | INDEX_7 | 1 | INDEX_8 | * | * | MOTORCYCLE INSURANCE MISSING |
| | INDEX_7 | 1 | INDEX_9 | * | * | MOTORCYCLE REGISTRATION BOOK MISSING |
| | INDEX_7 | 1 | INDEX_10 | * | * | HELMET MISSING |
| | INDEX_1 | 2 | INDEX_4 | * | * | VEHICLE 1 AND VEHICLE 2 KEYS PRESENT |
| | INDEX_1 | 2 | INDEX_7 | * | * | VEHICLE 1 AND MOTORCYCLE KEYS PRESENT |
| | INDEX_4 | 2 | INDEX_7 | * | * | VEHICLE 2 AND MOTORCYCLE KEYS PRESENT |
| | INDEX_22 | 1 | INDEX_26 | MO-FR | * | DRIVING LICENCE MISSING |
| 505-j | INDEX_20 | 1 | INDEX_14 | MO-FR | * | COMPANY BADGE MISSING |
| | INDEX_20 | 1 | INDEX_15 | * | * | COMPANY OFFICE KEYS MISSING |
| | INDEX_27 | 1 | INDEX_23 | * | * | FRED'S DRIVING LICENCE MISSING |
| | INDEX_28 | 1 | INDEX_24 | * | * | MARY'S DRIVING LICENCE MISSING |
| | INDEX_29 | 1 | INDEX_25 | * | * | JEROME'S DRIVING LICENCE MISSING |
| | INDEX_30 | 3 | INDEX_3 | * | * | HOME KEYS MISSING |
| | INDEX_20 | 1 | INDEX_16 | * | * | FRED'S MOBILE PHONE MISSING |
| | INDEX_19 | 1 | INDEX_17 | * | * | MARY'S MOBILE PHONE MISSING |
| | INDEX_21 | 1 | INDEX_18 | * | * | JEROME'S MOBILE PHONE MISSING |
| | INDEX_14 | 4 | — | SA-SU | * | COMPANY BADGE PRESENT |
| | INDEX_15 | 4 | — | SA-SU | * | COMPANY OFFICE KEYS PRESENT |
| | INDEX_20 | 1 | INDEX_31 | MO am | OUT | LAPTOP MISSING |
| 505-k | INDEX_20 | 1 | INDEX_31 | FR-pm | IN | LAPTOP MISSING |
| | INDEX_17 | 2 | INDEX_9 | * | * | MOTORCYCLE REGISTRATION BOOK PRESENT |

ADAPTIVE RULE BASED ELECTRONIC REMINDER FOR PERSONAL OBJECTS

CROSS-REFERENCE TO RELATED APPLICATIONS

The present invention claims the benefit of counterpart France Application FR 05108936.5 2211 filed Sep. 28, 2005, the entire content and disclosure of which is incorporated by reference as if fully set forth herein.

FIELD OF THE INVENTION

The present invention relates generally to method and systems for reminding users about objects to be carried or not carried and more specifically to an adaptive rule based electronic reminder for personal objects.

BACKGROUND OF THE INVENTION

Situations where personal objects should be carried or not, depending in particular upon the day of the week, the time, and the person, arise very often. Typical example situations are:

a person arrives in the office in the morning, and realizes that he/she forgot to take his/her company badge;

a person arrives in the office in the morning, and realizes that he/she missed to take his/her office room key ring;

a person leaves his home to pick up his car in the garage and realizes that he forgot to take the car keys;

a person leaves his home to drive to the office and realizes in the office that he holds the key of the car his wife drives; and, a person arrives at the tennis court and realizes that he forgot to take his racket.

Plenty of similar example situations exist where required personal objects are not carried or where undesired personal objects are carried.

U.S. Pat. No. 6,462,660 discloses a system and method of reminding a user of any missing portable electronic devices when leaving a location. A reminder device transmits a signal to each of the reminder enabled devices. The reminder device then alerts the user of any reminder enabled devices that did not transmit acknowledgment signals.

If the system disclosed in U.S. Pat. No. 6,462,660 is efficient for alerting a user of missing devices, it is not adapted to handle complex situations, in particular situations where a plurality of users handle different objects.

Thus, there is a need for a method and systems for checking the presence and absence of personal objects in a complex environment with multiple users.

SUMMARY OF THE INVENTION

It is an object of the present invention to provide a system and method that addresses the shortcomings of the prior art reminder device system.

It is another object of the invention to provide a method and system defining rules stating how personal objects carried by a person must be associated, and to identify situations infringing such defined rules.

It is a further object of the invention to provide a method and system for alerting the person carrying personal objects when a rule infringement is detected.

It is still a further object of the invention to provide a method and system for initiating pre-defined actions upon detection of the infringement of a pre-defined rule.

The accomplishment of these and other related objects is achieved by a method for detecting the presence and absence of objects amongst at least two objects, a tag having wireless communication means and a unique identifier being attached to each of the at least two objects, using a rule table storing at least one rule relative to the presence or absence of the objects according to the identifiers of the tags attached to the at least two objects, the at least one rule having the presence of one of the at least two objects object as condition and the presence or absence of the other one of the at least two objects as consequence, the method comprising the steps of:

a) receiving a list of identifiers of detected tags;

b) selecting as current rule the first rule of the rule table;

c) determining compliance with the current rule using the received list of identifiers and if the current rule is not complied with, forewarning the user; and, d) determining if the current rule is the last rule of the rule table and, if the current rule is not the last rule of the rule table, e) selecting the next rule of the rule table as current rule; and, f) repeating the steps c), d) and e).

Further embodiments of the invention are provided in the appended dependent claims.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 4 illustrates the object table wherein the main characteristics of the personal objects are stored in accordance with the invention;

FIG. 5 illustrates the rule table determining the relation between the personal objects in accordance with the invention;

DETAILED DESCRIPTION OF THE PREFERRED EMBODIMENT

Figure 1:
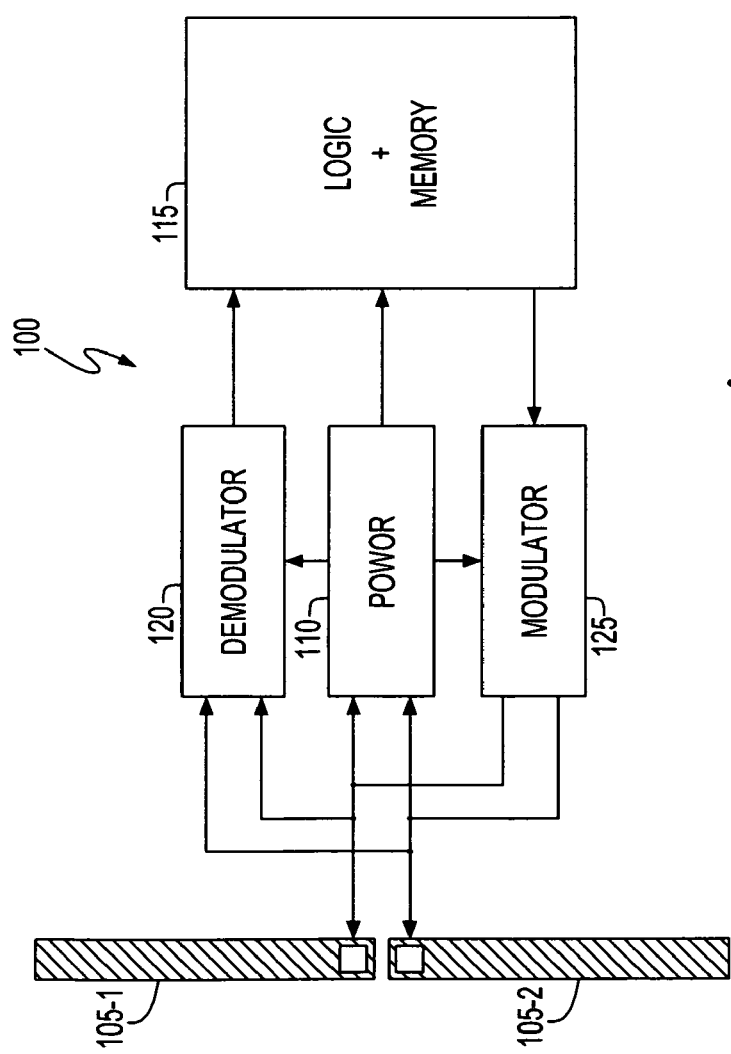
FIG. 1 depicts an example of the architecture of a passive RFID tag.

The present invention is directed to an RFID-based system for identifying presence or absence of personal objects on one or more persons, and, particularly, relies on combination of the following elements: 1) RFID tags, or equivalent radio frequency identifiers, that may be attached, stuck to, or otherwise mounted onto personal objects, such tags uniquely identifying such personal objects; 2) a computing device providing a graphical user interface (GUI) through which users are enabled to set rules defining authorized and forbidden associations of personal objects, such associations being possibly time dependent. Optionally, each of these rules may be associated with a warning message to be generated if the rule is not fulfilled; 3) an RFID tag reader device that may be installed, attached or otherwise mounted at a pre-defined checkpoint, e.g., a main gate of a house, a front door, for reading the radio frequency tags; and, 4) a device, such as a pervasive digital assistant, a personal computer such as a laptop or PC, or some stand-alone electronic device, that is associated with the radio frequency identifier reader at the pre-defined checkpoint or main gate that is able to check whether the list of read radio frequency tags matches or not the set of rules, and is able to alert the object holder accordingly.

For sake of illustration, the description hereinbelow is based upon an example wherein a family is composed of three members: the parents Fred and Mary, and the son Jerome. There are three vehicles: vehicle 1, vehicle 2 and a motorcycle. Fred works in a company. The family has determined the following rules:

the presence of Fred requests for the presence of his company badge and office keys from Monday to Friday;

the company badge and office keys must not leave (or enter) home during weekends;

the presence of Fred as a potential driver asks for the presence of his driving license;

the presence of Mary as a potential driver asks for the presence of her driving license;

the presence of Jerome as a potential driver asks for the presence of his driving license;

for any vehicle, the presence of the key asks for the presence of both the insurance papers and the registration book. Furthermore, the presence of the motorcycle asks for the presence of the helmet. This rule aims to comply with transport regulations;

the presence of more than one vehicle key is suspect. This rule aims to avoid situation where, for instance, Fred leaves home with the keys of Mary's car;

the presence of a vehicle key asks for the presence of a driving license;

the presence of a home key is mandatory;

everybody must carry his own mobile phone;

the laptop must leave home on Monday and return home on Friday; and,

Mary can not drive the motorcycle.

With respect to the use of Radio Frequency Identification (RFID) Tags, the present invention implements RFID tags that may be active or passive High Frequency (HF) tags and/or Surface Acoustic Wave (SAW) tags. However, any radio frequency identifier tags allowing wireless identifier access when tags are located e.g., within a pocket or a briefcase, from a distance of about one or two meters, can be used. In particular, tags based upon bluetooth and/or IEEE 802.11 technologies can be used to replace RFID tags or, be used in combination with RFID tags.

As known, the core of any RFID system is the 'Tag' or 'Transponder', which can be attached to or embedded within objects, and wherein data can be stored. An RFID reader, generically referred to hereinbelow as the reader, sends out a radio frequency signal to the RFID tag that broadcasts back its stored data to the reader. The system works basically as two separate antennas, one on the RFID tag and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Several kinds of RFID, such as piezoelectric RFID and electronic RFID, are currently available. For example, passive RFID tags do not require battery for transmission since generally, they are powered by the reader using an induction mechanism (an electromagnetic field is emitted by the reader antenna and received by an antenna localized on the RFID tag). This power is used by the RFID tag to transmit a signal back to the reader carrying the data stored in the RFID tag. Active RFID tags comprise a battery to transmit a signal to a reader. A signal is emitted at a predefined interval or transmitted only when addressed by a reader.

When a passive High Frequency (HF) RFID tag is to be read, the reader sends out a power pulse e.g., a 134.2 KHz power pulse, to the RFID antenna. The magnetic field generated is 'collected' by the antenna in the RFID tag that is tuned to the same frequency. This received energy is rectified and stored on a small capacitor within the RFID tag. When the power pulse has finished, the RFID tag immediately transmits back its data, using the energy stored within its capacitor as its power source. Generally, 128 bits, including error detection information, are transmitted over a period of 20 ms. This data is picked up by the receiving antenna and decoded by the reader. Once all the data has been transmitted, the storage capacitor is discharged, resetting the RFID tag to make it ready for the next read cycle. The period between transmission pulses is known as the 'sync time' and lasts between 20 ms and 50 ms depending on the system setup. The transmission technique used between the RFID tag and the reader is Frequency Shift Keying (FSK) with transmissions generally comprised between 124.2 kHz and 134.2 kHz. This approach has comparatively good resistance to noise while also being very cost effective to implement.

RFID tags can be read-only, write-once, or read-write. A read-only RFID tag comprises a read-only memory that is loaded during manufacturing process. Its content can not be modified. The write-once RFID tags differ from the read-only RFID tags in that they can be programmed by the end-user, with the required data e.g., part number or serial number. The read-write RFID tags allow for full read-write capability, allowing a user to update information stored in the tag as often as possible within the limit of the memory provided in the device and the memory technology implemented. Generally, the number of write cycles is limited to about 500,000 while the number of read cycles is not limited. A detailed technical analysis of RFID tag is disclosed e.g., in RFID (McGraw-Hill Networking Professional) by Steven Shepard, edition Hardcover, the contents and disclosure of which is incorporated by reference herein.

FIG. 1 depicts an example of the architecture of a passive HF RFID tag 100. As shown, the tag 100 includes a dipole antenna comprising two parts 105-1 and 105-2 that are connected to a power generating circuit 110 that provides current from received signal to the logic and memory circuit 115, to the demodulator 120, and to the modulator 125. The input of demodulator 120 is connected to the antenna (parts 105-1 and 105-2) for receiving the signal and for transmitting the received signal to the logic and memory circuit 115, after having demodulated the received signal. The input of modulator 125 is connected to the logic and memory circuit 115 for receiving the signal to be transmitted. The output of modulator 125 is connected to the antenna (parts 105-1 and 105-2) for transmitting the signal after it has been modulated in modulator 125.

The architecture of a semi-passive RFID tag is similar to the one represented on FIG. 1, the main difference being the presence of a power supply that allows it to function with much lower signal power levels, resulting in greater reading distances. Semi-passive tags do not have an integrated transmitter unlike active tags that comprise a battery and an active transmitter which allows them to generate high frequency energy and to apply it to the antenna.

Figure 2A:
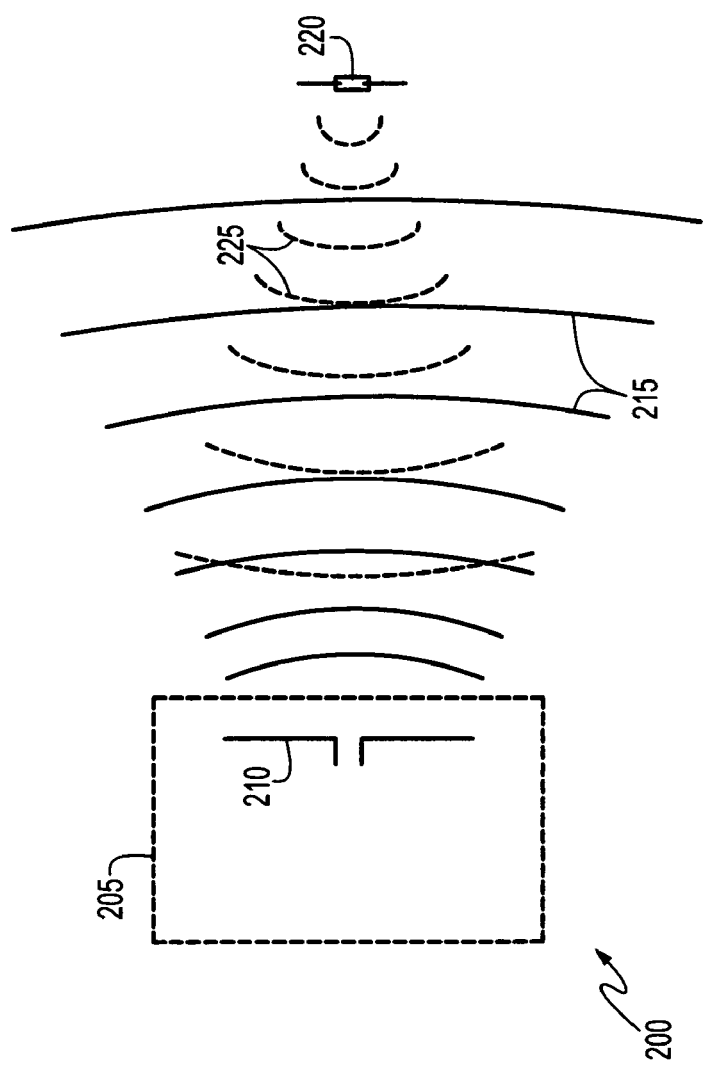
FIG. 2A depicts an RFID system according to one aspect of the present invention with a reader having an antenna and an RFID tag having a dipole antenna.
Figure 2B:
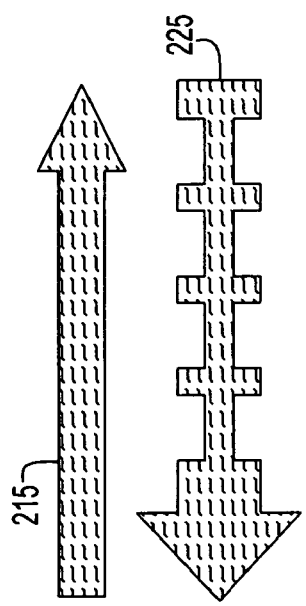
FIG. 2B depicts the signal emitted by the antenna of the reader and the modulated signal reflected by the RFID tag.

FIG. 2, comprising FIGS. 2A and 2B, depict an RFID system 200. As depicted in FIG. 2A, RFID system 200 comprises a reader 205 having an antenna 210. The antenna 210 emits a signal 215 that is received by an RFID tag 220. Signal 215 is reflected in RFID tag 220 and re-emitted as illustrated with dotted lines referred to as 225. FIG. 2B illustrates the signal 215 emitted by the antenna 210 of the reader 205 and the signal 225 reflected by the RFID tag 220. As shown in FIG. 2B, the reflected signal 225 is modulated.

Figure 3:
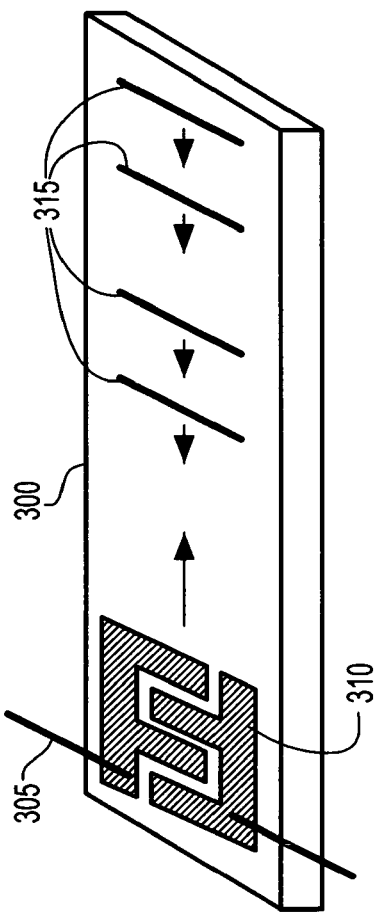
FIG. 3 depicts a surface acoustic wave RFID tag.

It should be understood that a different class of RFID tags, also known as piezoelectric, comprises Surface Acoustic Wave (SAW) RFID tags that use different physical principles based upon acoustic wave reflection. Thus, as shown in FIG. 3, a SAW RFID tag 300 comprises an antenna 305, an Inter-Digital Transducer (IDT) 310 and reflectors generically referred to as 315. The SAW RFID tag 300 converts a radio wave received from its antenna 305 in surface acoustic wave pulses in the IDT 310. That acoustic wave travels past the set of wave reflectors 315 to produce uniquely encoded acoustic wave pulses which travel back to the IDT 310, as shown in FIG. 3 with arrows. In turn, the IDT 310 converts the acoustic wave pulses into an encoded radio wave signal. The SAW RFID tags operate using the piezoelectric effect and do not require electrical power.

According to the invention, radio frequency identifier tags are attached to each personal object that presence or absence should be checked. An identifier is stored in each of them to uniquely identify the object it is attached to.

As now depicted in FIG. 4, the RFID tags data are recorded within an "object table" 400 structured, in an example embodiment, as shown in FIG. 4, that may be stored in a memory storage device of a computer or like computing device, e.g., floppy disk, volatile or non-volatile memory, RAM, ROM, EEPROM, optical or magnetic ROM, e.g., CD-ROM, and the like. This object table 400 is preferably stored within a reminder device, however, it can be stored in any memory device that can be accessed by the reminder device. In a further embodiment, this object table 400 additionally includes records describing virtual objects defined, in one example, through a Boolean expression function of real objects. Table 400 includes a set of records, generically referred to as 405. For sake of illustration, each record 405 includes the following fields: 1) an index field 410 uniquely identifying the object; 2) a type field 415 specifying if it is a real or virtual object; 3) an identifier field 420 specifying the object. For a real object, this field corresponds to the RFID identifier of the object; for a virtual object, this field corresponds to a Boolean function of Indexes; and, 4) a nick name field 425 comprising entries for facilitating object identification. This field is a string of alphanumeric characters. For instance, the value "Fred's home keys" identifies the home keys of Fred.

According to this example, the record 406, having index index_13, is a real object that RFID identifier is ID_M, corresponding to Jerome's home keys.

It should be understood that each personal object can be owned by a particular owner, by a plurality of owners, or can be carried by anyone. This information is not required by the system but is known when the system is set or tuned. For purposes of illustration, a hypothetical owner of each object has been written next to the table 400 of FIG. 4, even if this information does not necessarily belong to the object table 400. For example, the keys of vehicle 1 (index_1) can be carried by anyone, the keys of the motorcycle (index_7) can be carried either by Fred or by Jerome, while Mary's mobile phone (index_17) can be carried only by Mary.

The choice of the kind of the radio frequency identifier tag to be attached on a personal object mainly depends upon the personal objects. For example, it would be worthwhile to use a passive HF tag for tagging papers such as driving license since passive HF tags require large antenna but no power source, while an active HF tag is adapted to tag key rings since active HF tags do not require large antenna but a power source that can be easily integrated within a key ring.

The personal objects that should be carried or not depend upon numerous parameters among which include but are not limited to: the identifier of the person carrying these objects, the day of the week, the time, and the other carried personal objects. According to the invention, a set of rules defines the relationships, or associations, that must be fulfilled by the different objects controlled by the proposed system and the person carrying such objects. At least four types of associations must be supported:

type 1, "object A requires object B": if an object known under the identifier A is present, then the object known under the identifier B must also be present. For example, if Fred's mobile phone is present, his driving license must also be present;

type 2, "object A excludes object B": if an object known under the identifier A is present, then the object known under the identifier B must be absent. For example, if Fred's mobile phone is present, Mary's driving license must be absent;

type 3, "object A required": an object known under the identifier A must always be present in the set of detected objects. For example, home keys known under the identifier A must always be present; and, type 4, "object A excluded": an object known under the identifier A must always be absent in the set of detected objects. For example, a laptop known under the identifier A must always be absent during the weekend.

By combining these base rules, any type of situation can be addressed. Furthermore, the rules can be "time stamped" to discriminate between a situation that may be seen as relevant e.g., from Monday to Friday, and irrelevant e.g., during the weekend.

The set of rules is preferably stored within a "rule table" wherein each record corresponds to a particular rule applied to a real or virtual personal object. FIG. 5 illustrates an example of a rule table 500 having records that records are generically referred to as 505. For sake of illustration, each record 505 comprises the following fields:

an ID1 field 510 uniquely identifying the index of the object (real or virtual) to which this rule is applied;

a type field 515 identifying the type of the rule. It can take the values 1 to 4 according to the list of rule types defined herein;

an ID2 field 520 uniquely identifying the index of a second object (real or virtual), when the type field 515 is either equal to 1 or 2;

a time field 525 recording the time interval for which the rule applies. If the rule applies regardless of the time, then this field is left empty (noted with an "*" on the drawing for sake of clarity);

an optional direction field 530 specifying if the rule applies when the object is leaving or entering the reference gate (e.g. home); and, a warning message field 535 recording the message to be played and/or displayed upon detection of the rule infringement.

For example, record 505-*i* concerns the application of the rule of type 1 on the objects known under the identifiers index_7 and index_8. According to rule 505-*i*, the reminder must warn the user when the motorcycle keys (index_7) are detected while the motorcycle insurance (index_8) is not detected.

According to the method of the invention, the system implicitly detects the user identifier and thus, determines which personal objects are required or not. For example, according to record 505-*j*, the reminder warns the user when Fred's signet ring (index_20 of Rule Table 500) is detected during a labor day (Monday to Friday) while the company badge (index_14) is not detected i.e., Fred is alerted when he forgot his company badge when he should work but Mary is not alerted if she does not carry the company badge. The same rule may be applied with any personal object having a single owner such as identity card, driving license, or mobile phone.

Likewise, Mary, according to this example, does not own the motorcycle driving license and so, can not drive a motorcycle. Record 505-*k* set an alarm when recognizing Mary with her mobile phone (index_17) if she leaves with the motorcycle registration book (index_9).

For illustrative purposes, the rule table 500 uses object indexes that do not correspond to tag index, allowing the use of a single reference when dealing with a virtual object. However, it must be understood that rule table 500 can be based directly upon tag identifiers. In such a case, the object table 400 is mainly used for establishing the correspondence between tag identifiers and object nicknames.

The radio frequency identifier reader gate includes a tag reader for reading the radio frequency identifier tags stuck on or attached to the personal objects passing through the entry point location or "gate". In an example embodiment of the present invention, this radio frequency identifier reader gate is installed at the home front door to control objects entering and/or leaving the home boundaries.

Figure 6:
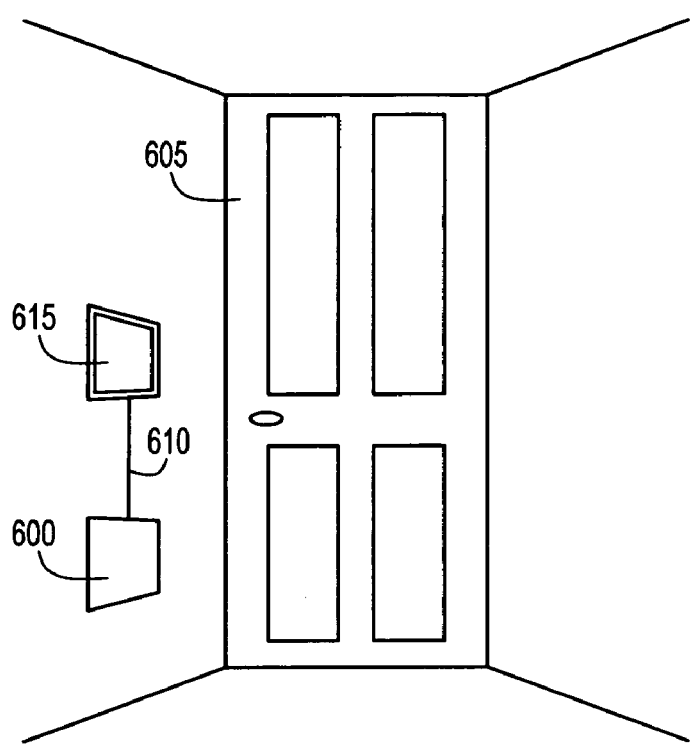
FIG. 6 depicts an example of the environment wherein the radio frequency identifier reader of the invention can be implemented.

FIG. 6 illustrates a radio frequency identifier reader comprising a RFID reader gate 600 fixed on a wall close to the front door 605. In this embodiment, the RFID reader gate 600 is connected, through a USB port 610 to the reminder device 615 during normal operation.

The RFID reader gate may optionally include a device for determining whether a read RFID tag is in fact either entering or leaving the reference gates. This can be done by conventional means, such as optical sensors or by ground sensors that are beyond the scope of the present invention.

When the RFID reader gate 600 detects the presence of RFID tags, it reads them within a pre-defined short time interval, and then passes to the reminder device 615 the list of tag identifiers read during this interval.

For sake of illustration, the described radio frequency identifier reader comprises only a single RFID reader gate 600 however, it should be understood that the radio frequency identifier reader can comprise a plurality of readers of the same type or of different types. For example, the radio frequency identifier reader can comprise a RFID reader, a bluetooth reader, and an IEEE 802.11 reader.

The implementation of the reminder device can be done on a conventional computer system (through a software program leveraging the set of available hardware capabilities), or on a stand-alone device, or through a combination of conventional or stand-alone type computing devices. The later case corresponds to the preferred embodiment of the present invention, where the reminder device is a USB key that can be either plugged on the RFID reader gate during normal operation or, plugged onto an USB port of a personal computer during rule definition or update operations.

Figure 7:
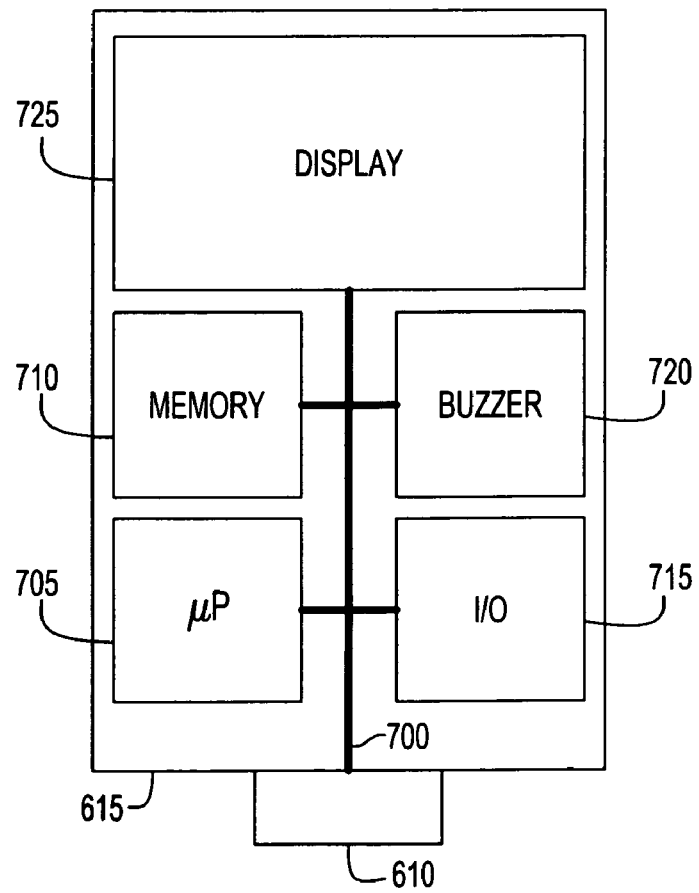
FIG. 7 illustrates the architecture of the reminder device according to the invention; and, FIG. 8 depicts an example of the algorithm that can be implemented within the reminder device of the invention.

The structure of the reminder device 615, depicted in FIG. 7, preferably comprises the following components:
- a USB port 610 allowing to communicate with external devices, such as the RFID reader gate 600 or a personal computer;
- an internal bus 700 where flow information data among the different sub-components;
- a CPU or microprocessor 705 which control all the operations and functions of the reminder device 615;
- a memory 710 holding the object table 400 and the rule table 500, as well as the embarked instructions allowing the micro processor 705 to control and operate the reminder device 615;
- an I/O controller 715 driving communications on the internal bus 700, in particular when directed to and from the USB port 610;
- a buzzer 720 for producing audible warning messages; and,
- a display 725 for producing visible warning messages.

The reminder device 615 operates according to two different modes. In a first mode, referred to as "rule definition" mode, the reminder device 615 is plugged onto the USB port of a personal computer, driven by the relevant software program running on this personal computer. In this "rule definition" mode, the reminder device is passive, and the software program running on the personal computer provides a user interface allowing a user to define and update the rules governing the reminder device operations, as well as to manage the set of recognized RFID tags stuck on or attached to personal objects. Any change onto the object table 400 or onto the rule table 500 is recorded in the memory 710.

In a second mode, referred to as "operation" mode, the reminder device 615 is plugged onto the RFID reader gate 600, as shown in FIG. 6. In this mode, the microprocessor 705 controls the operations of the reminder device 615. Specifically, it can receive from the RFID reader gate 600 information data corresponding to read RFID tags. Upon reception of this information, the reminder device 615 follows the logic described by reference to FIG. 8 as will now be explained in greater detail.

Figure 8:
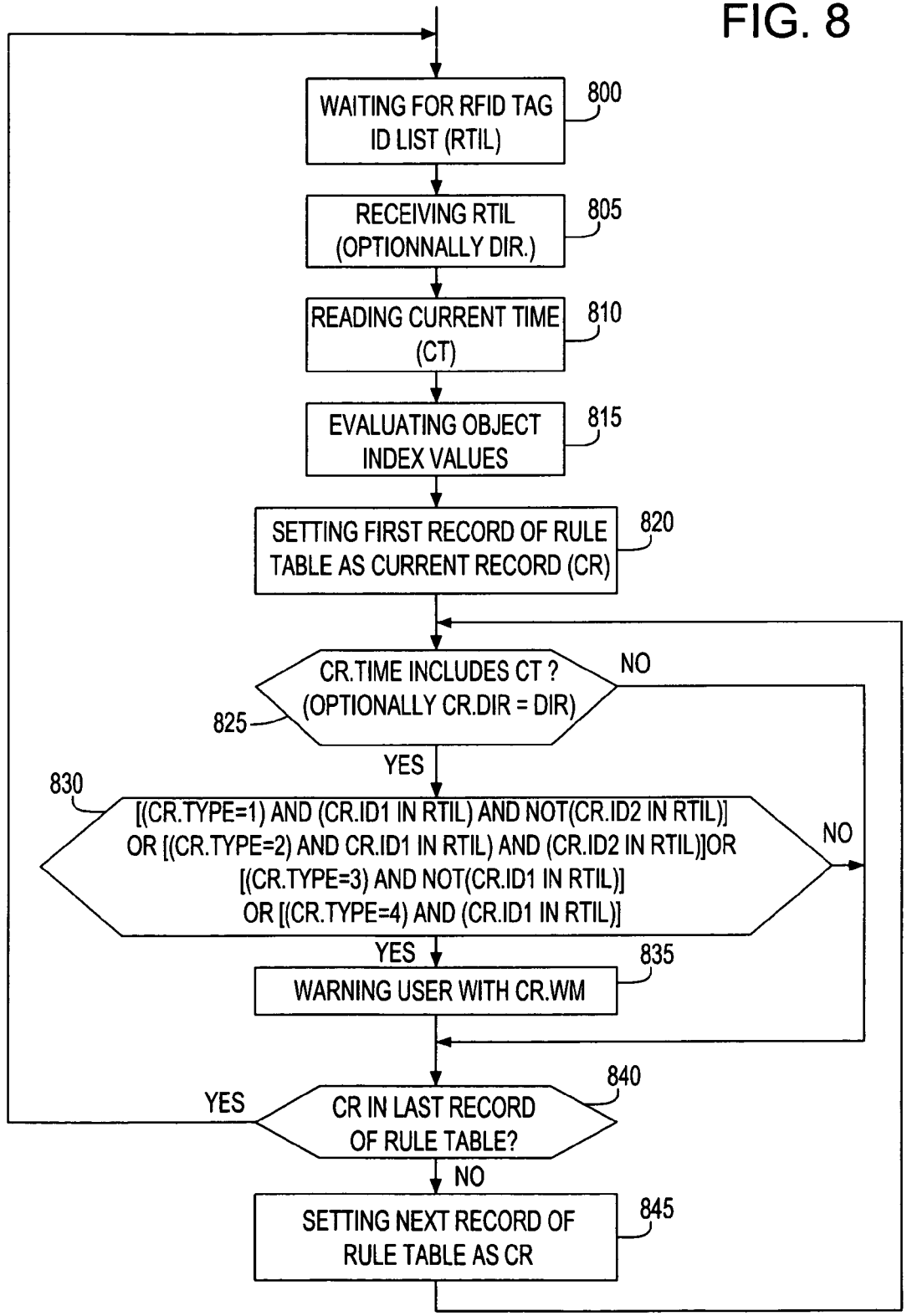

FIG. 8 illustrates an example of the algorithm implemented in the reminder device 615 for warning the user if a personal object is detected when it should be absent or, if a personal object is not detected when it is required to be present. In a first set of steps the algorithm implements: waiting for the listing of the identifiers of all the detected tag and receiving this list, referred to as Received Tag Identifier List, RTIL for short at respective steps 800 and 805. Optionally, depending upon the system implementation and requirements, the 'in' or 'out' direction according to which the tags have been detected by the radio frequency identifier reader gate can be received with the list RTIL. Then, the reminder device gets the current date and time, referred to as CT at step 810, and determines the indexes of the objects, using the tag identifiers, according to the object table 400 to determine which objects are present and which are not at step 815. A variable CR (Current Record) corresponding to rule record as stored in rule table 500 is created and initialized to the value of the first record of the rule table 500 at step 820. Then, a first test is performed at step 825 to determine whether or not the rule corresponding to the current record CR applies. As mentioned above, the rule applies if the time of the record (CR.time) includes the current time (CT). Optionally, the test further comprises a condition based upon the tag direction (CR.dir). If the rule applies, a second test is performed at step 830 to determine if the rule is respected, i.e., complied with. As mentioned above in the given example, the rule can be of four types. If the rule is of the first type (CR.type=1) and if the object having ID1 as identifier (CR.ID1) is present, the object having ID2 as identifier (CR.ID2) must also be present. If the rule is of the second type (CR.type=2) and if the object having ID1 as identifier (CR.ID1) is present, the object having ID2 as identifier (CR.ID2) must be absent. If the rule is of the third type (CR.type=3), the object having ID1 as identifier (CR.ID1) must be present. If the rule is of the fourth type (CR.type=4), the object having ID1 as identifier (CR.ID1) must be absent. If the rule is not complied with, a warning is generated with the corresponding message (CR.WM) stored in the rule table at step 835. As mentioned above, the warning message can be displayed, can be played, or can be displayed and played. Then, a third test is performed at step 840 to determine whether or not the current record is the last one of the rule table 500. If the current record is not the last one of the rule table 500, the current record CR is set to the next record of the rule table 500 at step 845, and the algorithm branches to step 825 to determine whether or not the rule of the new current record applies. If the current record is the last one of the rule table 500, the algorithm is branched to step 800 for waiting to the next list of identified tags. If the rule of the current record does not apply as determined at step 825 or, if the rule of the current record is complied with as determined at step 830, the algorithm is branched to step 840 to determine whether or not the current record is the last one of the rule table 500.

As a natural extension of the above problem, the proposed invention can be easily extended, without departing from his core spirit, to address similar problems:

rules can be defined for discriminating cases where somebody either leaves or enters his home; and, the system can be adapted to environment dealing with offices or working places instead of home.

Likewise, the reminder device can consist in a wearable reminder device such as a mobile phone or Personal Digital Assistant (PDA) that reminder function is activated in particular locations. For example, the wearable reminder device can comprise a radio frequency identifier reader so that the reminder function is activated when detecting a particular radio frequency tag identifier. In such a case, the rules may vary according to the radio frequency tag identifier activating the reminder function. Therefore, the warning can vary with the locations. The radio frequency tag identifiers activating the reminder function can be installed at home door, at office door, and/or in a vehicle.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for detecting the presence and absence of objects amongst at least two objects comprising:
    a) providing a plurality of tags, each tag for attachment on a corresponding object of said at least two objects, each tag having a wireless communication device and a unique identifier,
    b) providing a rule table storing at least one rule relative to the presence or absence of said objects according to the tag identifiers of said tags attached to said at least two objects, said at least one rule having the presence of one of said at least two objects as condition and the presence or absence of the other one of said at least two objects as consequence;
    c) providing an object table having tag entries for recording object and corresponding tag identifier data, wherein a tag entry comprises at least one virtual object representing a logical combination of said at least two objects;
    d) receiving a list of identifiers of detected tags;
    e) selecting as a current rule, a rule from said rule table;
    f) from said received list of identifiers of detected tags, determining if said current rule is applicable and in compliance, and if said current rule is not in compliance, generating a warning for a user; and,
    g) determining if said current rule is a last rule of said rule table and, if said current rule is not the last rule of said rule table,
    h) selecting the next rule of said rule table as the current rule; and,
    i) repeating steps f)-h) until said current rule is said last rule.

2. The method of claim 1, wherein said step of determining if said current rule is applicable comprises:
    determining a current time; and,
    comparing said current time with a time associated with the identifier of the tag attached to the object that presence is the condition of said current rule.

3. The method of claim 2, wherein a warning message is associated to each rule of said rule table, said warning message being one or more of: displayed on a display device, played on an audio play back device, or displayed and played, when the corresponding rule is applicable and is not in compliance.

4. The method of claim 3, further comprising: detecting a predetermined event, and, warning the user upon detection of said predetermined event.

5. The method of claim 4, wherein said predetermined event comprises the detection of a predetermined identifier of a tag.

6. The method of claim 4, wherein said tags having said wireless communication device comprise a passive or semi-passive Radio Frequency Identification (RFID) device.

7. The method of claim 1, further comprising: identifying in said object table at least the identifiers of said tags attached to said at least two objects and the name of the corresponding object, the name of the objects that presence or absence causes at least one rule to be not in compliance.

8. A program storage device tangibly embodying software instructions which are adapted to be executed by a computing device to perform a method for detecting the presence and absence of objects amongst at least two objects, said method steps comprising:
- a) providing a plurality of tags, each tag for attachment on a corresponding object of said at least two objects, each tag having a wireless communication device and a unique identifier,
- b) providing a rule table storing at least one rule relative to the presence or absence of said objects according to the tag identifiers of said tags attached to said at least two objects, said at least one rule having the presence of one of said at least two objects as condition and the presence or absence of the other one of said at least two objects as consequence;
- c) providing an object table having tag entries for recording object and corresponding tag identifier data, wherein a tag entry comprises at least one virtual object representing a logical combination of said at least two objects;
- d) receiving a list of identifiers of detected tags;
- e) selecting as a current rule, a rule from said rule table;
- f) from said received list of identifiers of detected tags, determining if said current rule is applicable and in compliance, and if said current rule is not in compliance, generating a warning for a user; and,
- g) determining if said current rule is a last rule of said rule table and, if said current rule is not the last rule of said rule table,
- h) selecting the next rule of said rule table as the current rule; and,
- i) repeating steps f)-h) until said current rule is said last rule.

* * * * *